Figures 1, 2, 3:
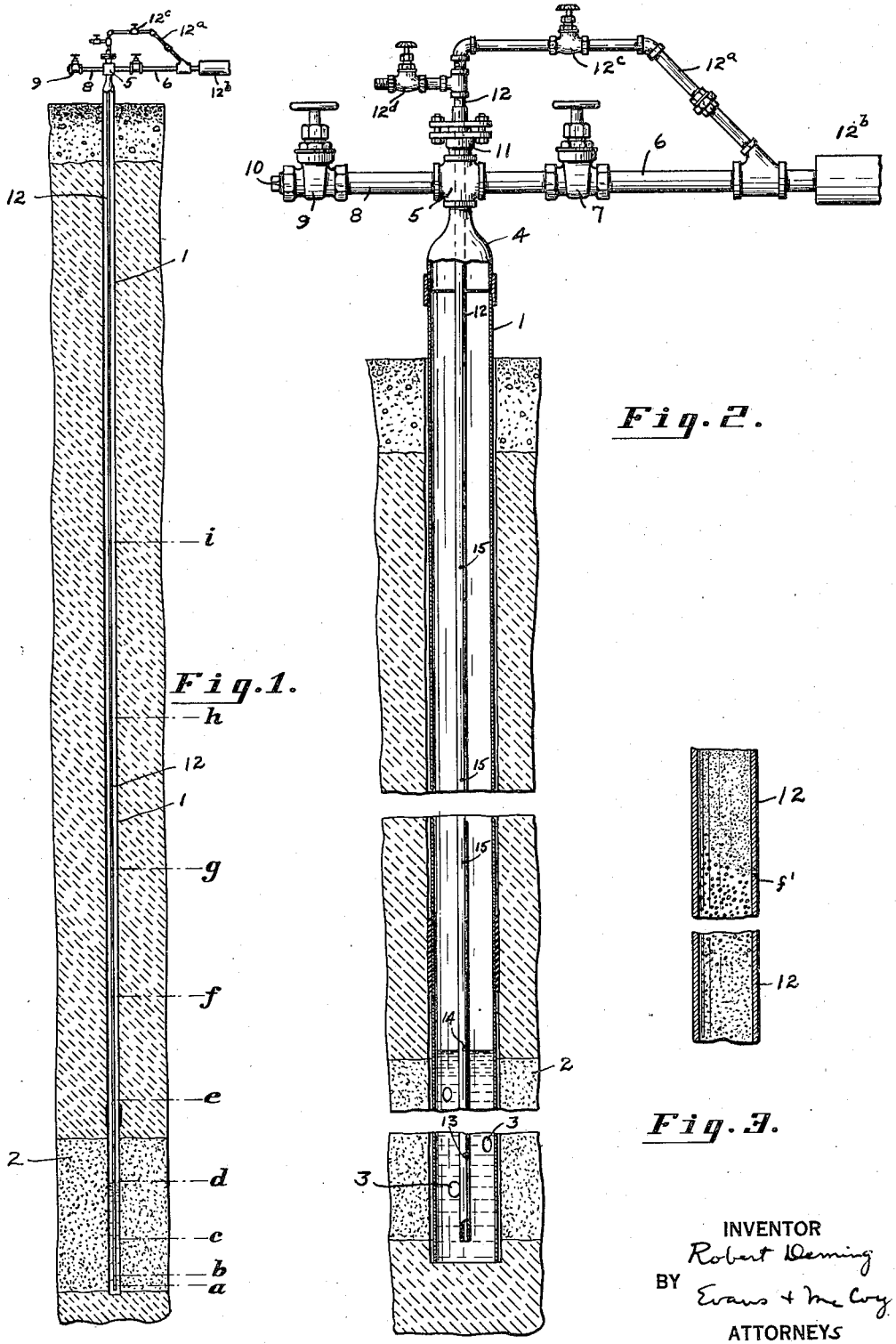

Jan. 8, 1929.  1,697,856
R. DEMING
PROCESS OF REMOVING LIQUID FROM WELLS
Filed June 13, 1927

INVENTOR
Robert Deming
BY Evans + McCoy
ATTORNEYS

Patented Jan. 8, 1929.

1,697,856

UNITED STATES PATENT OFFICE.

ROBERT DEMING, OF CINCINNATI, OHIO.

PROCESS OF REMOVING LIQUID FROM WELLS.

Application filed June 13, 1927. Serial No. 198,496.

This invention relates to the removal of liquid from wells, and particularly to a method of removing liquid from an oil or gas well.

It is well known in the art that subterranean rock pressures are usually insufficient to cause the liquid in the well, whether it be oil or water or both of these, to rise to the top of the well and, in order to remove the liquid from such wells, it must be elevated to the surface, generally from great depths.

It has at times been common in the art to pump the liquid from such wells by expensive reciprocating pumps. It has also been customary to lift the liquid from the wells through small size tubing by means of gas pressure created in the well casing. For the shallower wells, sufficient gas pressure may readily be created to bodily lift the column of liquid from the well whereas in the deeper wells it has been customary to introduce bubbles of gas into the column of liquid to break up the column into sections of liquid and sections of gas or to disperse gas bubbles throughout the liquid column in order to reduce the weight of the column and thereby reduce the gas pressure necessary to bodily lift the column of liquid from the well. These systems are conveniently known as embodying the principles of the well known air lift, and by "air lift" in this application it is understood to refer to those methods in which the gas is dispersed in the liquid and the gas becomes the disperse phase, whereas the liquid is present in the continuous phase. In the case of many air lift devices, very severe vibrations are caused by the spasmodic discharge of the liquid and gas sections and these vibrations are very detrimental to the entire well equipment. Another objectionable feature of the air lift system is that the use of high gas pressures within the well casing cause the oil in the pay strata to be forced away from the well. This temporarily or permanently retards the flow of oil toward the well casing and requires, in many instances, that the liquid be intermittently withdrawn from the well, that is, after suitable periods of rest during which time liquid again collects in the well.

According to the present invention, liquid is removed from the well in a continuous stream having the characteristics of a gas, the moving stream of gas being utilized as a carrier for the liquid and depending upon its velocity head to remove liquid from the well.

My present invention further contemplates the nebulizing of the liquid to be removed from the well so that the gas and liquid are carried out of the well as a continuous stream of gas and dispersed particles of finely divided liquid, the gas thus being in the continuous phase and the liquid in the disperse phase and the formation of objectionable emulsions or foams is avoided.

The terms "continuous phase" and "dispersed phase" have the meaning usual among colloid chemists. Where a mixture of two mutually insoluble bodies exist, it is in general found that one body forms one continuous mass, such that a point might move anywhere in the mass without ever moving out of its substance, while the other body exists in particles embedded in the first material, these particles being completely cut off from one another by interposition of substance belonging to the first body. The latter body of material is considered to be "dispersed" and to exist in a "dispersed phase", while the first body is considered to be "continuous" and to exist as a "continuous phase".

According to this method of removal of liquid, a relatively small differential pressure is required between the discharge tubing and the interior of the well casing. This relatively low working pressure and the freedom from objectionable vibration of the well equipment has many very important advantages that will be apparent to those skilled in the art. This proposed method of removing liquid from the well differs fundamentally from air lift systems where the column of liquid is bodily lifted from the well, either as an unbroken column of liquid or as an aerated column with interposed bubbles or sections of gas which reduce the weight of the column.

The apparatus for removing liquid from a well in accordance with my proposed method usually comprises a discharge tube or pipe disposed inside the well casing and provided with suitably spaced apertures arranged at different elevations between the bottom and the top of the well. A somewhat greater pressure of gas is established in the well casing outside the liquid discharge tube or pipe than exists inside the pipe either through the use of the natural gas pressure of the well or by suitable external means. Due to this arrangement, a relatively small differential gas pressure is caused to act on the top portion of the liquid in the discharge pipe to finely subdivide or nebulize it so that it is carried upwardly through the discharge pipe and out of the well in a continuously moving stream of gas and dispersed particles of finely divided liquid substantially suspended in the gas stream, whereby the flow of the fluid has the characteristics of a gas. Thus the liquid is removed from the well by using a relatively low differential or working pressure between the outside and inside of the discharge pipe.

The apparatus disclosed in this application is included in my copending application, Serial No. 321,563 filed November 24, 1928, in which application the claims are directed to the apparatus for carrying out the method of removing liquid from wells.

The primary object of this invention is to provide a method of removing liquid from a relatively deep well in a continuous stream having the characteristics of a gas by employing gas under relatively low working pressures.

Another object of the invention is to provide a relatively simple and inexpensive method for removing liquid from a well smoothly and continuously by using relatively low gas pressure and without objectionable vibration of the apparatus.

A further object of the invention is to provide a method of removing liquid from a well at substantially the rate at which the liquid normally flows into the well, thus keeping the liquid level in the well at the point desired.

Another object of the invention is to provide a method of removing the liquid from the well automatically by the use of the gas pressure of the well without unduly dissipating the gas from the pay strata, thus causing the natural gas content of the strata to assist in forcing the oil toward the well.

A further object of the invention is to utilize the gas pressure of the well and only a minimum amount of additional gas or gas pressure to continuously elevate the liquid from the well when the gas or gas pressure of the well is not sufficient in itself to remove the liquid from the well as fast as it flows into the well without the formation of objectionable emulsions or foams.

Another object of the invention is to provide a method of removing liquid from a well, whether the well be initially full of liquid or not, and with a working gas pressure only slightly greater than the pressure of the line into which the liquid and/or gas from the well is to be discharged.

Another object of the invention is to provide a method of removing liquid from a well which can be applied to a deep well relatively full of liquid and which will remove the liquid from such well and continue to function automatically until the liquid is reduced to the desired working level and then continue to remove additional liquid entering the well.

These and other objects and advantages of practicing the invention will be apparent to those skilled in the art from the description hereinafter given of an illustrative embodiment of the invention that is shown in the accompanying drawings wherein:

Figure 1 is a diagrammatic vertical section of a well indicating the proper spacing of the apertures in the discharge tubing for certain well conditions;

Fig. 2 is an enlarged vertical section of the well with parts broken away showing the connections and relation of the apparatus within and at the top of the well; and Fig. 3 is an enlarged cross-sectional view of portions of the well tubing shown at different elevations and diagrammatically illustrating what applicant believes to be the condition of the stream of material within the discharge tubing.

In the drawing, a well casing 1 is shown extending downwardly into and preferably through the pay strata 2 in which may be present gas, oil and water. The lower portion of the well casing is provided with apertures 3 to admit the gas and liquid to the interior of the casing. The top of the casing is provided with a suitable cap 4 which is preferably connected with a four way passage member 5. Extending from the member 5 is a pipe line 6 provided with a suitable valve 7 which is shown in partially closed condition to serve as a choke. Any suitable choke valve may be used at this place, for it is only necessary to keep the working pressure in the well casing the desired degree above the pressure of the line 6. The pipe 8 at the left of the member 5 is preferably provided with a valve 9 and a plug 10. This extension is a convenience which may be used for testing and other purposes if desired.

Carried by the upper portion of the member 5 is a stuffing box 11 which is provided with suitable packing through which extends a relatively small discharge or ejector tube 12 which serves as the discharge tube for the stream of nebulized or finely divided liquid and gas from the well. The small tube 12 extends into the casing to a point adjacent the bottom of the well or to the depth from which it is desired to raise liquid.

The discharge pipe 12 may discharge into any suitable receiving apparatus. In the drawing it is shown as connected directly through the pipe 12ª into the gas line 6 from the well. The converging lines are connected to a suitable gas and liquid separator diagrammatically indicated at 12ᵇ. Suitable valves 12ᶜ and 12ᵈ may be connected to the discharge line 12 to enable the operator to suitably control the flow of the well.

The discharge pipe 12 is provided with a series of relatively small apertures, the longitudinal distance between which is preferably progressively decreased from the top of the well to the bottom of the pipe. For purposes of explanation it will now be assumed that the well to which the apparatus is applied is a flowing gas well in which some water is just beginning to enter at the bottom of the well. In the well shown, the gas normally discharges from the well through the pipe 12 and, when sufficient water enters the well to reach the bottom of the pipe 12, a differential pressure will be established between the region within the well casing outside the pipe 12 and the inside of the pipe 12. This differential in pressure, which may be termed the "working pressure", causes the water to rise to the first aperture 13 in the pipe 12. As soon as the water reaches this aperture the gas outside of the pipe 12 which is constantly flowing through the aperture 13 acts upon the liquid to cause it to become finely subdivided or nebulized and causes it to flow upwardly through the pipe 12 in a continuous stream of gas and dispersed particles of finely divided liquid. As the stream of liquid and gas passes upwardly through the pipe, its flow is naturally retarded somewhat in its passage through the pipe and this is particularly true since the pipe 12 is relatively small in diameter. There is also a tendency for the dispersed liquid particles to combine or condense on the side walls of the pipe as the stream flows through the pipe 12. However, upon reaching the next aperture 14 above, an additional flow of gas therethrough renebulizes the mixture and also accelerates the speed of flow upwardly through the pipe 12. This condition is repeated at every aperture 15 thereabove that is present in the pipe 12. The mixture then passes through the upper end of the pipe at the surface of the well where it may be separated in any suitable manner into liquid and gas and made available for use.

The total area of all of the apertures 13, 14 and 15 in the pipe 12 is considerably less than the cross-sectional area of the pipe and it may be as much as 5 or 10 per cent of the cross-sectional pipe area or even less. These very small apertures therefore prevent the differential or working pressure existing between the gas inside and the gas outside of the pipe from being equalized, even though all the apertures are uncovered and the gas flowing through every aperture into the pipe simultaneously. Due to the fact that the speed of the atomized gas is accelerated as each aperture is passed, the space between the apertures may be increased toward the top of the well. This spacing has other advantages which will now be described.

The ratio of the sum of the areas of the apertures in the discharge pipe 12 to the cross-sectional area of the discharge pipe is dependent upon the depth of the well and upon the amount of differential pressure that it is desired to maintain to operate upon the liquid. In the case of shallower wells, for example, the ratio of the area of the holes may be considerably larger than 10 per cent, but in any event the area of the holes must be less than the cross-sectional area of the discharge pipe in order to maintain a suitable working pressure for the nebulization and removal of the liquid.

If the well contains a large amount of liquid which is in a state of equilibrium, that is, the pressure within the discharge pipe 12 being equal to the natural pressure of the well, my apparatus can be utilized to remove such liquid from the well and then to continuously remove additional incoming liquid. If there is considerable gas pressure within the well casing, a differential may be established by opening the discharge pipe 12 into the discharge line or to the atmosphere and thus there will exist more pressure outside of the pipe 12 than inside. If the pressure between the top of the liquid and the top of the well is merely atmospheric, the pressure in the well casing could be raised to establish a differential working pressure by introducing additional gas into the well casing outside of the pipe 12, or an evacuating pump could be connected to the pipe 12, or both of these methods of establishing a suitable differential pressure could be utilized at the same time.

As soon as a differential pressure is established, the liquid will be forced upwardly in the pipe 12 until it reaches one of the apertures where it is nebulized as above described. As liquid is removed through the pipe 12, the liquid level in the well casing may drop and this may continue until another aperture is uncovered. As each successive aperture is uncovered, it becomes the primary agent to nebulize or disperse the liquid in the gas stream and each aperture above the first exposed aperture assists in the nebulization and also serves as a booster for accelerating the flow of the stream. This operation continues until the liquid is reduced to the desired working level.

It will be seen from the above description that the liquid is removed from the well in a continuous stream having the characteristics of a gas, wherein the gas serves as a carrier for the dispersed particles of the finely divided liquid. Fig. 3 of the drawing diagrammatically illustrates my conception of the condition of the stream at different elevations in its upward travel. In the lower pipe section in Fig. 3 the stream is illustrated in the condition in which it leaves one of the lower apertures not shown in this figure. As the stream flows upwardly through the pipe 12 the dispersed liquid particles tend to combine to form larger particles of liquid in the gas stream as illustrated in the lower portion of the upper pipe section of Fig. 3 and below the aperture $f'$. At the aperture $f'$ the additional flow of gas therethrough again breaks up or nebulizes the liquid particles in the gas stream as indicated in Fig. 3.

The mixture of gas and liquid discharged from the well may be separated in any desired manner, as by the use of special separators or by collecting the mixture and permitting the separation to take place under the action of gravity. If the gas that is used is hydrocarbon, and the liquid that is being removed is oil, these, of course, may be forced after separation directly into the gas and the oil lines of the field, or into any suitable reservoirs or containers desired. If the liquid be a mixture of oil and water, it may also be readily separated and the water removed from the oil before the oil is put into the line.

As an example of the application of my invention to a gas well, a well is shown in Fig. 1 in which the longitudinal spacing of the apertures in the pipe 12 is diagrammatically indicated by the level lines $a$, $b$, $c$, $d$, $e$, $f$, $g$, $h$ and $i$. In this particular example the distance of each aperture from the bottom of the well is as follows:

| | Feet. |
|---|---|
| $i$ | 645 |
| $h$ | 495 |
| $g$ | 365 |
| $f$ | 255 |
| $e$ | 165 |
| $d$ | 95 |
| $c$ | 45 |
| $b$ | 15 |
| $a$ | 5 |

The well in this example is approximately 1000 feet deep and an open flow produced 700,000 feet of gas per day. The rock pressure was 210 pounds per square inch. The pipe 12 was 1 inch in diameter. The six upper apertures were 1/32 inch in diameter, the apertures at the 45 foot and 15 foot levels were 3/64 inch in diameter, and the aperture at the 5 foot level was 1/16 inch in diameter. With this arrangement all of the gas and liquid was discharged through the discharge pipe 12 into a line pressure of 125 pounds per square inch and the working pressure in the well casing was 145 pounds, giving a working differential pressure between the well casing and the pipe 12 of 20 pounds per square inch. The gas produced from this well with my invention installed was the same as would normally be produced by such a well which produced no liquids and produced gas against the same working pressure.

In a continuously operated well such as just described the lowest exposed aperture is the primary nebulizer and the upper apertures accelerate the flow of and renebulize the liquid particles in the gas stream. If it becomes desirable to close in the well for a period of time, this may be readily accomplished by closing the choke valve 7 and the valve $12^c$ in the discharge pipe, or the well also may be effectively closed by a rise in the line pressure originated at some distant point. In either of these cases the provision of the upper apertures in the discharge pipe serve the function of automatically causing liquid that may accumulate in the well during the closed in period to be elevated and discharged, and the well to assume normal operation upon the lowering of the line pressure from any cause so that a differential working pressure is established.

As above indicated, it is quite obvious that my invention may be applied to wells that are producing gas as a primary product and some liquid, such as oil and water.

My invention is also very advantageous for use in connection with wells in which oil is the primary product. In the case of such wells, if more gas is being dissipated to produce a barrel of oil than is necessary under the particular conditions of that well, the gas can be conserved in the earth to prolong the life of the well, as will now be explained.

It is obvious that the amount of gas necessary to produce a barrel of oil is quite variable and dependent upon the particular conditions obtaining at a certain well, such as the viscosity of the oil, the depth of the well, and numerous other factors. If the gas in the oil well is greatly in excess of that necessary to elevate the oil through the discharge pipe, the gas may be readily conserved by simply utilizing sufficient gas to elevate the incoming oil and/or water as fast as it flows into the well.

If, however, an oil well is not making sufficient gas to elevate the oil to the surface of the earth, additional gas or gas pressure may be supplied from any suitable source or a suction line may be connected with the pipe 12 to create a sufficient working pressure differential between the casing and the discharge pipe to remove the oil or liquid flowing into the well. It will be understood, however, that the additional gas pressure necessary is usually quite low as well can frequently be operated with a differential or working pressure of ten pounds per square inch. The desired working pressure, of course, depends upon the depth of the well, the amount of liquid to be removed per day, and other conditions or factors particularly applicable to the well. It will thus be seen that my invention is very advantageous under these conditions since the working pressure necessary to remove the oil or liquid is much less than that required to elevate the oil or liquid by the use of the so-called air lift process.

It will be seen that by suitably selecting the size of the discharge pipe for a well, suitably choosing the size of the apertures in the discharge pipe and the proper spacing and location of the apertures longitudinally of the pipe, that my invention can be used to great advantage in practically any gas or oil well. It will be seen that in the application of my invention to a well in which considerable oil or water may have accumulated that it is essential to provide the discharge pipe with one or more apertures above the liquid level in the well in order that after a working differential is established between the outside and inside of the discharge pipe, the gas may begin to act upon the top portion of the liquid in the pipe to nebulize it and cause its upward flow through the pipe.

It will thus be seen that by proper consideration of the natural characteristics of a gas well or an oil well, my invention may be readily adapted to obtain efficient production of gas with the continuous discharge of all incoming liquid, or efficient production of oil with a minimum quantity of gas or the desired quantity of gas.

It will also be apparent that this invention may be applied to other relatively deep wells in which it is desirable to remove a liquid.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The process of removing liquid from a well, which includes forming a column of liquid of relatively small diameter above the liquid level of the well, subjecting the column to a continuously applied gas pressure substantially less than that required to elevate out of a well a column of liquid lightened by the addition of gas, impinging a stream of gas upon the top portion of the column of liquid of relatively small diameter and above the liquid level of the well to continuously cause dispersion of the liquid into finely divided particles forming a mist suspended in the stream of gas, the gas constituting the continuous phase, and carrying such particles of liquid in finely divided form out of the well in the upward flow of the gas stream.

2. The process of removing liquid from a well, which includes forming a column of liquid relatively small in diameter above the liquid level of the well, subjecting the column to a continuously applied, relatively low pressure substantially less than that required to elevate a column of liquid lightened by the addition of gas out of the well, impinging a stream of gas at substantially the same relatively low pressure upon the top portion of the column of liquid above the liquid level of the well to continuously cause nebulization and dispersion of the top portion of the liquid in the relatively small column into finely divided particles of liquid forming a mist suspended in the stream of gas, and forcing additional streams of gas against the upwardly moving particles of liquid to cause redispersion of the particles and to accelerate the flow upwardly of the gas stream carrying the finely dispersed particles of liquid suspended therein, and discharging such particles of liquid from the well in the stream of gas.

3. The process of removing liquid from a well in a stream of gas, which includes forming a column of liquid relatively small in diameter above the liquid level of the well, forcing a stream of gas at substantially the same relatively low pressure upon the top portion of the column of liquid above the liquid level of the well to cause nebulization and dispersion of the liquid in the top portion of the relatively small column into finely divided particles of liquid suspended in the stream of gas and carrying such particles of liquid in finely divided form out of the well by the upward flow of the gas stream under relatively low working pressure and maintaining the particles of liquid in sufficiently finely divided form so that they remain substantially in suspension during their upward flow out of the well.

4. The process of removing liquid in a stream of gas from an oil or gas well, which includes continuously impinging a stream of gas upon the top portion of a column of liquid in the well with sufficient velocity to continuously disperse the liquid into finely divided particles forming a mist substantially suspended in the stream of gas, and causing the gas carrying the liquid to move upwardly and out of the well whereby the pressure within the gas column is relatively uniform throughout the column of gas.

5. The process of removing liquid in a stream of gas from an oil or gas well, which includes impinging a stream of gas upon the top portion of the liquid with sufficient velocity to continuously disperse the liquid into finely divided discrete liquid particles suspended in the stream of gas, thereby forming a mist in which the liquid particles are in the dispersed phase and the gas is in the continuous phase, and removing the gas carrying the liquid particles from the well.

6. The process of removing liquid from an oil or gas well in a stream of gas, which includes bringing a stream of gas into contact with the top portion of liquid in the well, and continuously dispersing the liquid therein into finely divided separate particles forming a mist substantially suspended in the gas stream, the particles constituting a dispersed phase within the gas, the gas constituting a continuous phase, and removing such mixture of gas and liquid particles from the well.

7. The process of removing liquid in a stream of gas from a gas or an oil well having a discharge pipe therein, which includes causing a greater gas pressure around the discharge pipe than exists inside the discharge pipe, introducing gas into the discharge pipe upon the top portion of the liquid with sufficient velocity to cause dispersion of the liquid into separate, finely divided particles forming a mist, substantially suspended in the stream of gas, and causing a continuous upward movement of the stream of gas with the particles of liquid suspended therein, the liquid constituting a dispersed phase and the gas constituting a continuous phase, whereby the pressure within the gas flow is relatively uniform throughout the column.

8. The process of removing liquid in a stream of gas from a gas or an oil well having a discharge pipe therein, which includes causing a greater gas pressure around the discharge pipe than exists inside the discharge pipe, introducing a stream of gas through a relatively small aperture into the discharge pipe above the liquid level of the well with sufficient velocity to cause dispersion of the liquid in the discharge pipe into finely divided particles forming a mist substantially suspended in the stream of gas, the gas constituting the continuous phase, and simultaneously introducing streams of gas through other relatively small apertures disposed in the discharge pipe at different levels above the first aperture to cause redispersion of the particles of liquid and to accelerate the flow upwardly of the gas stream carrying the finely dispersed particles of liquid suspended therein, and discharging such particles of liquid from the well in the stream of gas.

9. The process of removing liquid in a stream of gas from a gas or an oil well having a discharge pipe therein, which includes causing a greater gas pressure around the discharge pipe than exists inside the discharge pipe, introducing a stream of gas above the liquid level of the well through one of a series of apertures in the discharge pipe with sufficient velocity to cause dispersion of the liquid in the discharge pipe into finely divided particles forming a mist substantially suspended in the stream of gas, the gas constituting the continuous phase, and simultaneously introducing streams of gas through other relatively small apertures disposed at increasingly great distances apart in the discharge pipe above the first aperture, to accelerate the flow upwardly of the gas stream carrying the finely dispersed particles of liquid suspended therein, and discharging such particles of liquid from the well in the stream of gas.

In testimony whereof I affix my signature.

ROBERT DEMING.